(12) United States Patent
Vasseur et al.

(10) Patent No.: US 9,553,773 B2
(45) Date of Patent: Jan. 24, 2017

(54) LEARNING MACHINE BASED COMPUTATION OF NETWORK JOIN TIMES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 13/948,367

(22) Filed: Jul. 23, 2013

(65) Prior Publication Data
US 2014/0222975 A1 Aug. 7, 2014

Related U.S. Application Data

(60) Provisional application No. 61/761,122, filed on Feb. 5, 2013.

(51) Int. Cl.
*G06F 15/173* (2006.01)
*H04L 12/24* (2006.01)

(52) U.S. Cl.
CPC ............. *H04L 41/16* (2013.01); *H04L 41/142* (2013.01)

(58) Field of Classification Search
None
See application file for complete search history.

(56) References Cited

U.S. PATENT DOCUMENTS

| | | | |
|---|---|---|---|
| 5,761,502 A * | 6/1998 | Jacobs | ............. H04L 41/16 |
| 6,327,550 B1 * | 12/2001 | Vinberg | ........... G06F 11/3006 |
| | | | 700/48 |
| 6,765,892 B1 | 7/2004 | Leung et al. | |
| 7,421,578 B1 | 9/2008 | Huang et al. | |
| 7,603,440 B1 * | 10/2009 | Grabowski | ....... G06F 17/30067 |
| | | | 709/220 |

(Continued)

OTHER PUBLICATIONS

Jo-Anne Ting at al. "Efficient Learning and Feature Selection in High-Dimensional Regression", Neural Computation 22, 831-886 (2010).*

(Continued)

*Primary Examiner* — Scott B Christensen
(74) *Attorney, Agent, or Firm* — Parker Ibrahim & Berg LLC; James M. Behmke; Stephen D. LeBarron

(57) ABSTRACT

In one embodiment, techniques are shown and described relating to learning machine based computation of network join times. In particular, in one embodiment, a device computes a join time of the device to join a computer network. During joining, the device sends a configuration request to a server, and receives instructions whether to provide the join time. The device may then provide the join time to a collector in response to instructions to provide the join time. In another embodiment, a collector receives a plurality of join times from a respective plurality of nodes having one or more associated node properties. The collector may then estimate a mapping between the join times and the node properties and determines a confidence interval of the mapping. Accordingly, the collector may then determine a rate at which nodes having particular node properties report their join times based on the confidence interval.

20 Claims, 20 Drawing Sheets

(56) References Cited

U.S. PATENT DOCUMENTS

| | | | |
|---|---|---|---|
| 8,213,362 B2 * | 7/2012 | Lee | H04W 99/00 370/328 |
| 2006/0288030 A1 * | 12/2006 | Lawrence | G09B 7/02 |
| 2007/0016590 A1 * | 1/2007 | Appleby | H04L 12/2602 |
| 2007/0280123 A1 * | 12/2007 | Atkins | H04L 41/142 370/252 |
| 2008/0239997 A1 | 10/2008 | Walker et al. | |
| 2010/0124240 A1 * | 5/2010 | Lu | H04W 56/00 370/503 |
| 2011/0022698 A1 | 1/2011 | Salam et al. | |
| 2012/0079592 A1 * | 3/2012 | Pandrangi | H04L 47/10 726/22 |
| 2012/0213117 A1 | 8/2012 | Banerjee et al. | |
| 2012/0303760 A1 * | 11/2012 | Begen | H04L 65/4076 709/219 |
| 2013/0124730 A1 * | 5/2013 | Buerk | H04L 69/28 709/225 |
| 2013/0262686 A1 * | 10/2013 | Hill | H04L 65/1069 709/228 |
| 2013/0294284 A1 * | 11/2013 | Popa | H04L 63/065 370/254 |

OTHER PUBLICATIONS

Ting, et al., "Efficient Learning and Feature Selection in High-Dimensional Regression", Neural Computation, 22(4), Apr. 2010, 831-886, Massachusetts Institute of Technology.

Vasseur, et al., "Remote Probing for Remote Quality of Service Monitoring", U.S. Appl. No. 61/761,106, filed Feb. 5, 2013, 26 pages, U.S. Patent and Trademark Office.

Vasseur, et al., "Fast Learning to Train Learning Machines Using Shadow Joining", U.S. Appl. No. 61/761,110, filed Feb. 5, 2013, 25 pages, U.S. Patent and Trademark Office.

Vasseur, et al., "Fast Learning to Train Learning Machines Using Smart-Triggered Reboot", U.S. Appl. No. 61/761,116, filed Feb. 5, 2013, 24 pages, U.S. Patent and Trademark Office.

Vasseur, et al., "Learning Machine Based Detection of Abnormal Network Performance", U.S. Appl. No. 61/761,117, filed Feb. 5, 2013, 39 pages, United States Patent and Trademark Office.

Vasseur, et al., "Learning Machine Based Computation of Network Join Times", U.S. Appl. No. 61/761,122, filed Feb. 5, 2013, 37 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

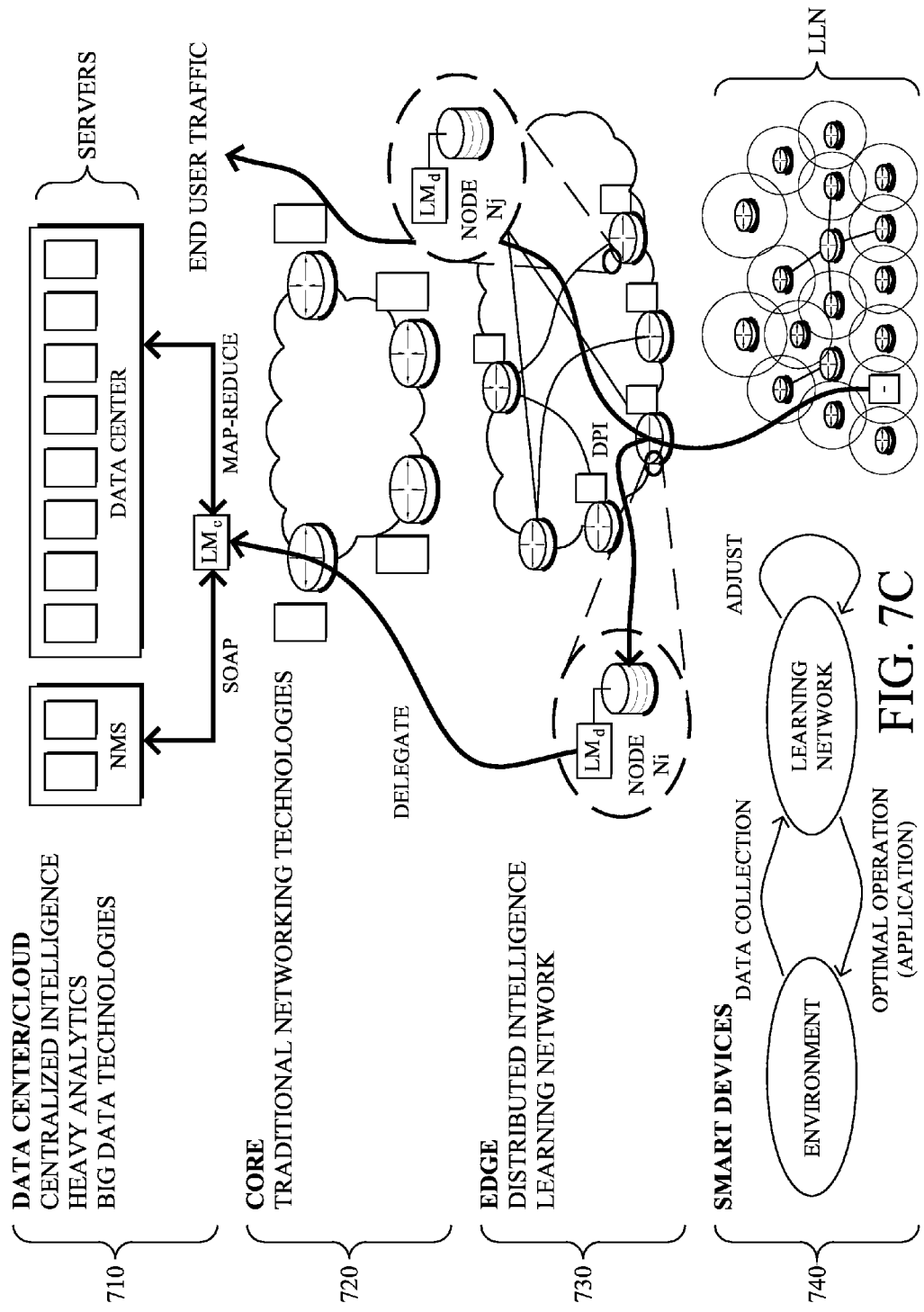

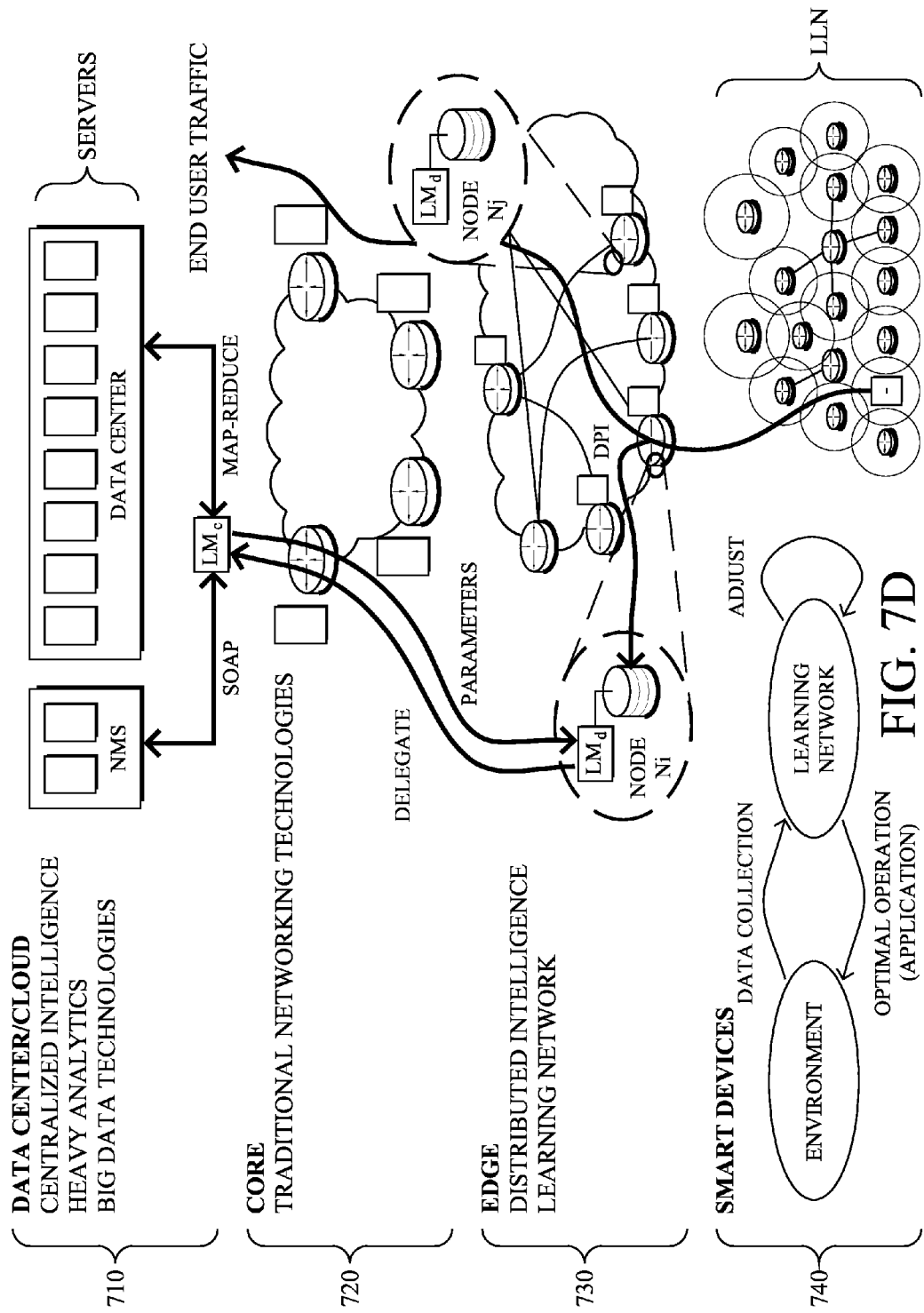

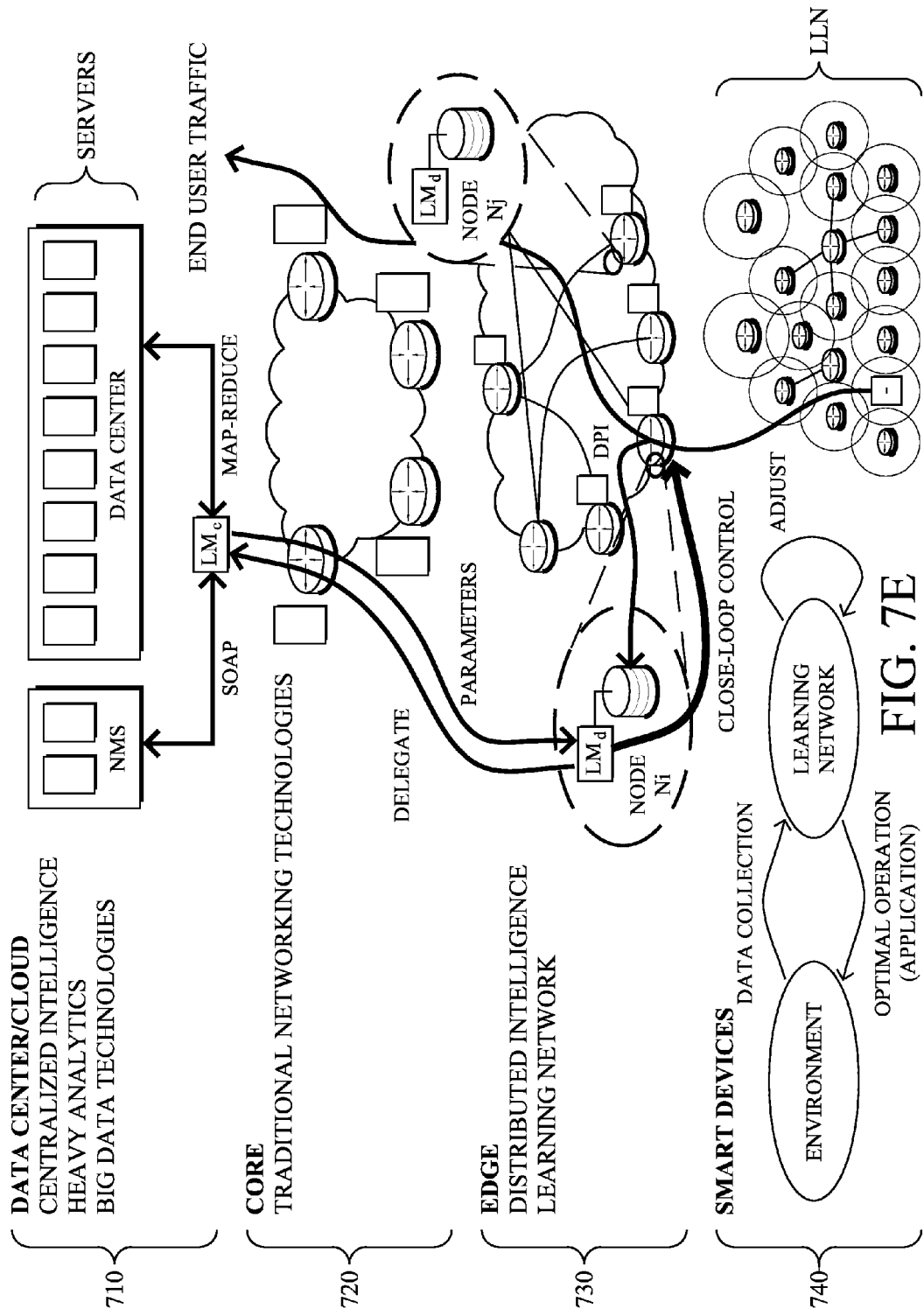

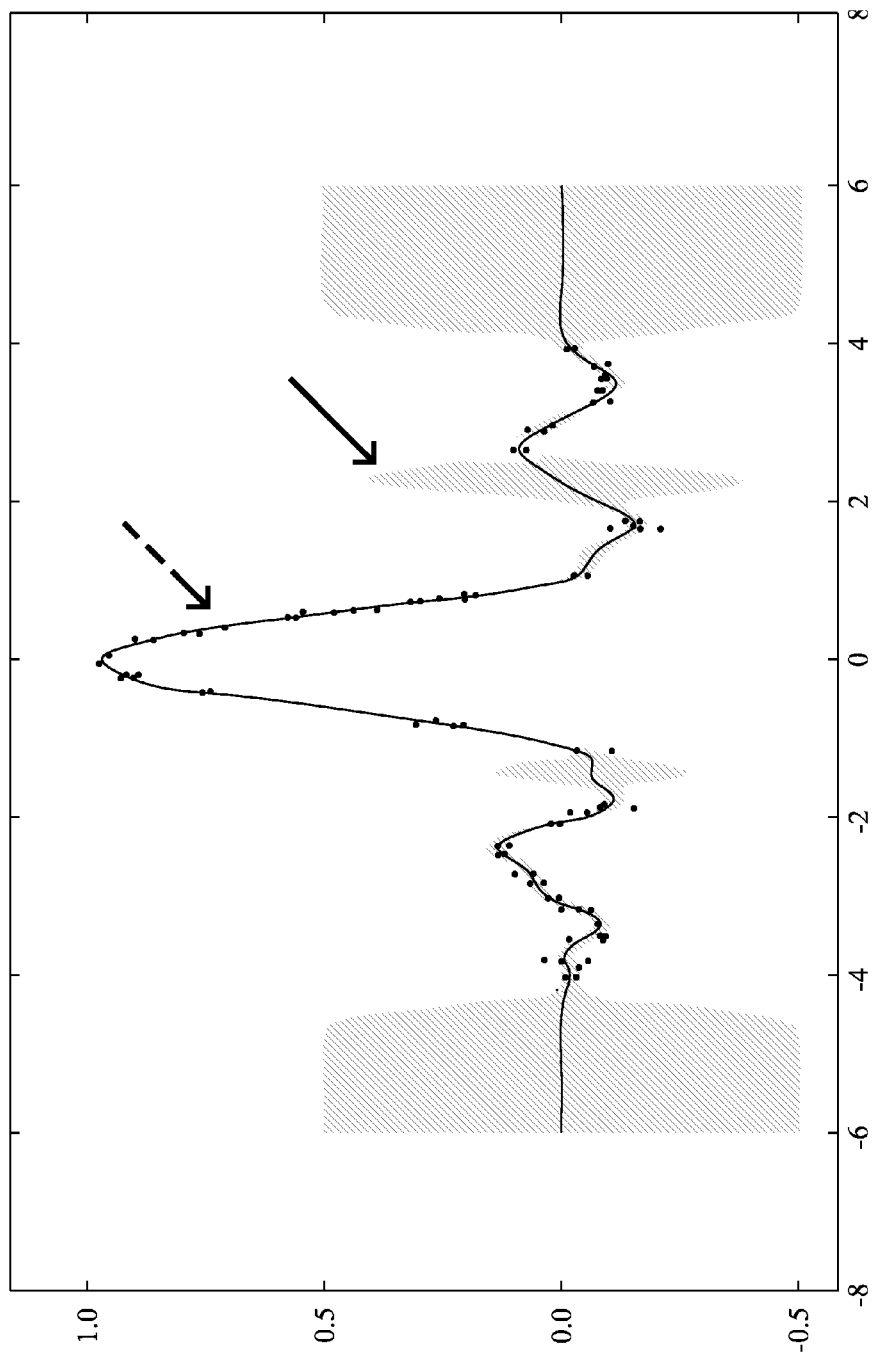

FIG. 9

REGRESSION USING VBLS-RVM, THE CORRESPONDING CONFIDENCE INTERVAL IS DEPICTED USING THE SHADED AREA. THE SOLID ARROW INDICATES A REGION OF LOW CONFIDENCE THAT WOULD REQUIRE MORE DATA POINT. AS A RESULT, ANY NODE LYING IN THIS REGION WOULD BE REQUIRED TO REPORT ITS JOINING TIME TO THE LM_D. CONVERSELY, REGIONS OF HIGH CONFIDENCE (DASHED ARROW) DO NOT REQUIRE ANY FURTHER MEASUREMENT.

LEARNING MACHINE BASED COMPUTATION OF NETWORK JOIN TIMES

RELATED APPLICATION

The present invention claims priority to U.S. Provisional Application Ser. No. 61/761,122, filed Feb. 5, 2013, entitled "LEARNING MACHINE BASED COMPUTATION OF NETWORK JOIN TIMES", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7E illustrate an example of a distributed learning machine environment;

FIG. 9 illustrates an example regression graph and associated confidence;

DESCRIPTION OF EXAMPLE EMBODIMENTS

Overview

Figure 1:
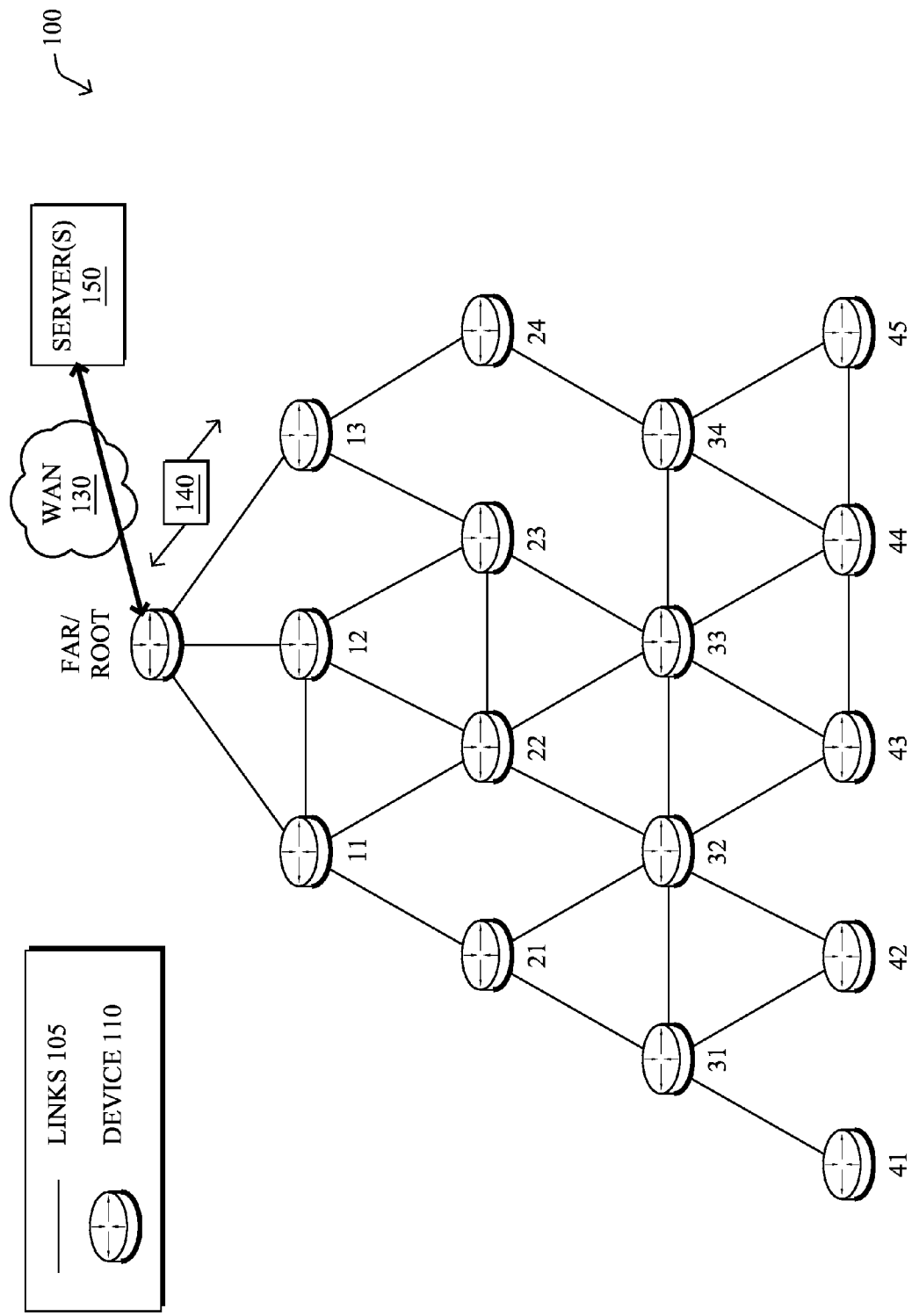
FIG. 1 illustrates an example communication network.

According to one or more embodiments of the disclosure, techniques are shown and described relating to learning machine based computation of network join times. In particular, in one embodiment, a device computes a join time of the device to join a computer network. During joining the computer network, the device sends a configuration request to a server, and receives instructions from the server whether to provide the join time. As such, the device may then provide the join time to a collector in response to instructions to provide the join time.

In another embodiment, a collector receives a plurality of join times from a respective plurality of nodes having one or more associated node properties. The collector may then estimate a mapping between the join times and the node properties and determines a confidence interval of the mapping. Accordingly, the collector may then determine a rate at which nodes having particular node properties report their join times based on the confidence interval.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
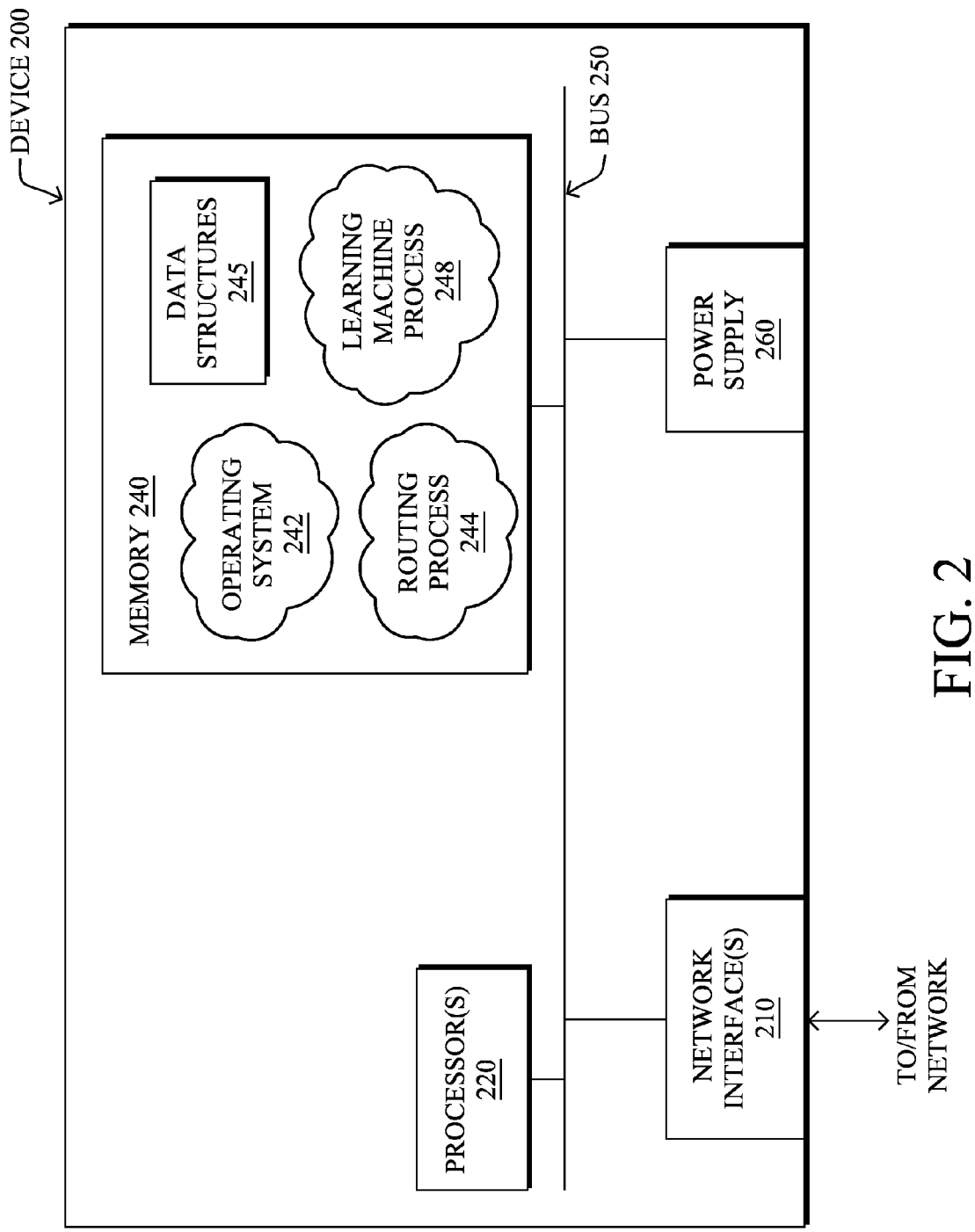
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
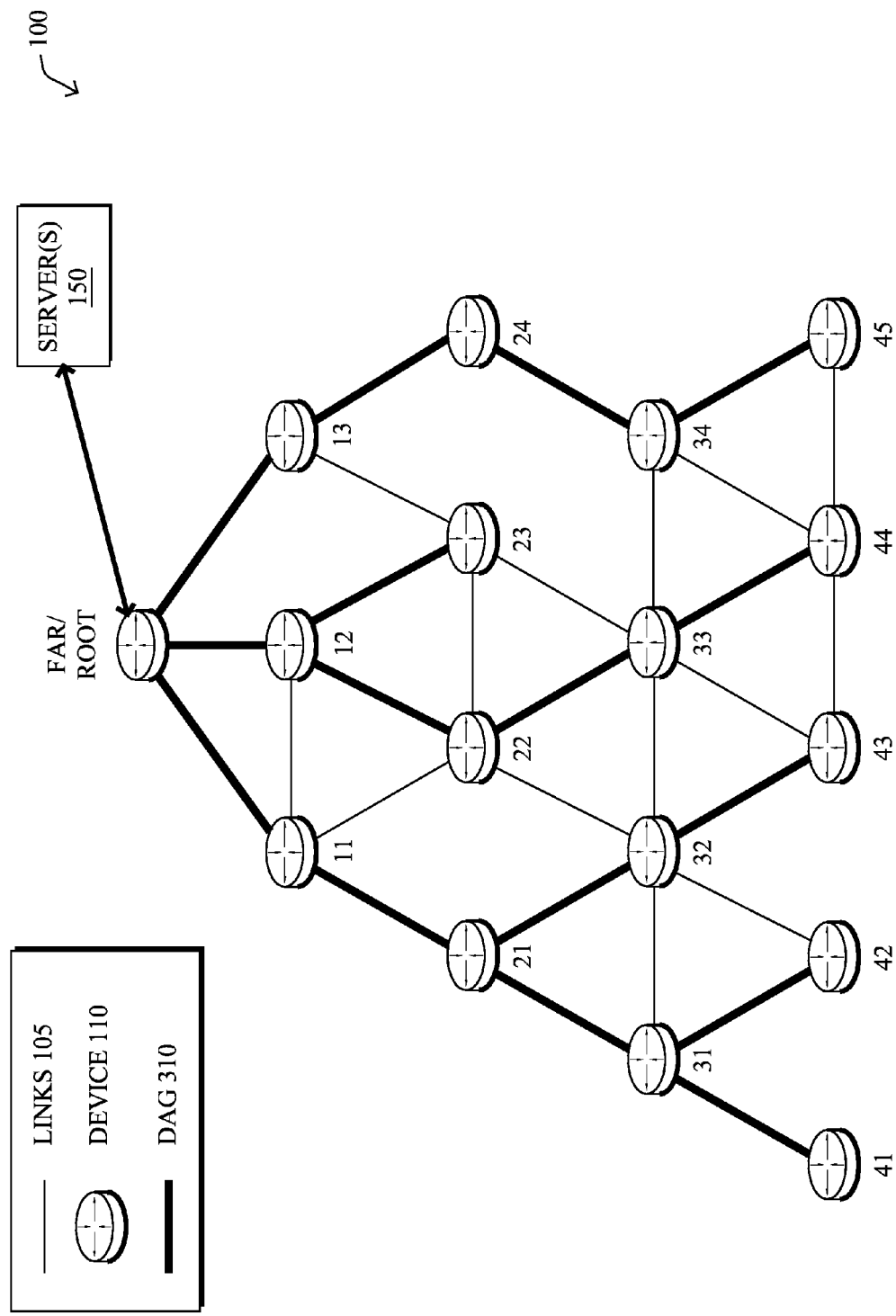
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad \text{(Eq. 1)}$$

Figure 4:
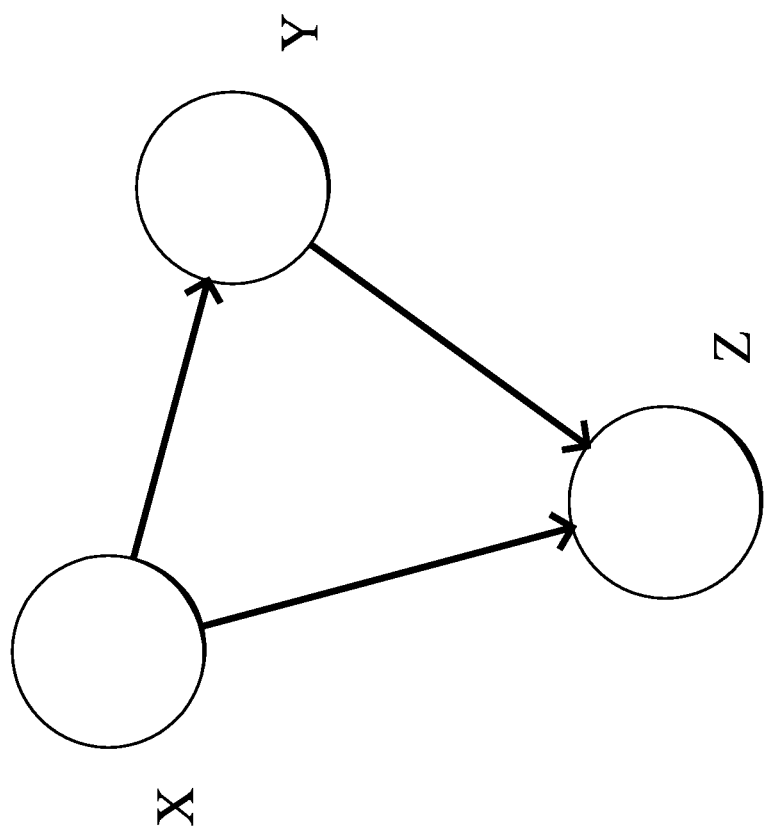
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$ (e.g., hop count, rank, firmware version, etc.) and a given networking metric $M_i$, a linear regression may be performed. More specifically, given the following equation:

$$M_i=F(x_i)=b^T x_i+\epsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE=\Sigma_i (b^T x_i - y_i)^2/N \quad \text{(Eq. 3)}$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
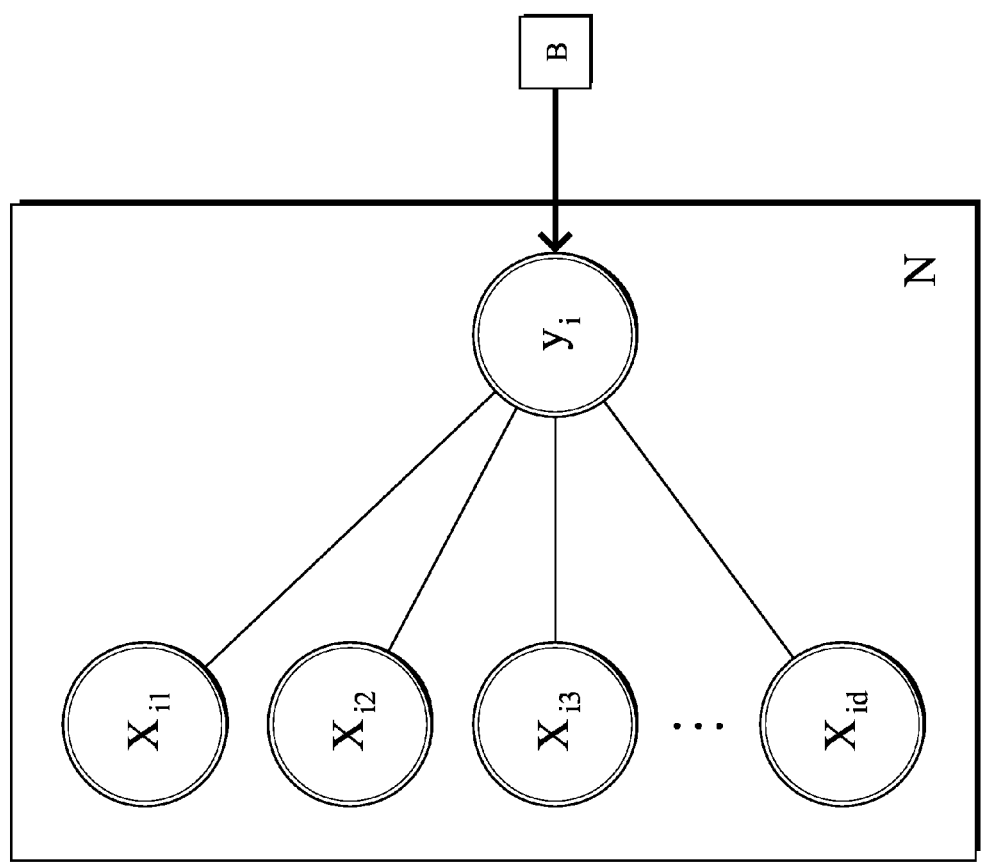
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Another critical issue when estimating the mapping between $x_i$ and $M_i$ is that their relationship may be non-linear. Even in this case, one may use tools from linear regression such as VBLS: instead of performing the mapping between the raw data x and $M_i$, one may increase the dimensionality of the input space by extending it with non-linear transformations of the input data. These transformations may be called features, and are noted $f_j(x)$. These features $f_j(x)$ may be non-linear functions of one or more dimensions of x. Below are a few examples:

$$f_i(x) = x_i$$

$$f_{d+1}(x) = x_1 \cdot x_2$$

$$f_{d+2}(x) = \exp(x_1)$$

$$f_{d+3}(x) = x_1^3$$

$$f_{d+4}(x) = \log(x_1)$$

In this context, one may rewrite the linear regression as follows:

$$M_i = F(x_i) = \Sigma_j b_j f_j(x_i) + \epsilon \text{ for } j=1, 2, \ldots \quad \text{(Eq. 4)}$$

However, this approach poses one key challenge: there is an infinite number of possible features $f_j(x)$. As a result, even though VBLS has the ability to perform feature selection in an efficient way, the problem of exploring this infinitely large set of features is yet to be solved. Also, when considering only simply combinations of input dimension such as $f_1(x)=x_1 \cdot x_2$, $f_2(x)=x_1^2 \cdot x_2$, or $f_3(x)=x_1 \cdot x_2^2$, there is no guarantee that one can construct an accurate mapping $F(x_i)$, because there may be a need to incorporate non-integer powers of x (square roots, etc.) or more complex functions such as $\exp(\cdot)$, $\log(\cdot)$, or even trigonometric functions (e.g., $\sin(\cdot)$, $\cos(\cdot)$ etc.). This 'catalogue' of feature 'type' needs to be explored in a more or less intelligent way such that one can construct the most accurate mapping $F(x_i)$. Solutions to this problem range from a manual feature selection based on expert knowledge to automated exploration of the solution space using meta-heuristics.

One of most critical performance metrics of LLNs perceived by end-users such as utilities, is the time for a node to join a network, thus directly impacting the time for the mesh to become operational, especially after a FAR reboot/crash. Indeed, in order to join a mesh, a typical LLN device must complete a number of steps:

1) Discover a PAN (i.e. a specific network in IEEE 802.15.4 terminology);

2) Perform 802.1x-based mutual authentication and obtain link security keys;

3) Discover a default route (e.g., by using RPL, which by itself involves a number of steps);

4) Configure a global IPv6 address (e.g., by using DHCPv6); and

5) Advertise a global IPv6 address to configure downward routes (e.g., by using RPL);

The ratio of LLN devices to FARs can be anywhere from 1000 to 5000 LLN devices for every FAR. As a result, each PAN will typically contain from 1000 to 5000 LLN devices. Furthermore, LLN deployments can be dense and LLN devices can easily have hundreds of neighbors. For these reasons, properly building a stable network topology can take tens of minutes, if not hours.

Figure 6:
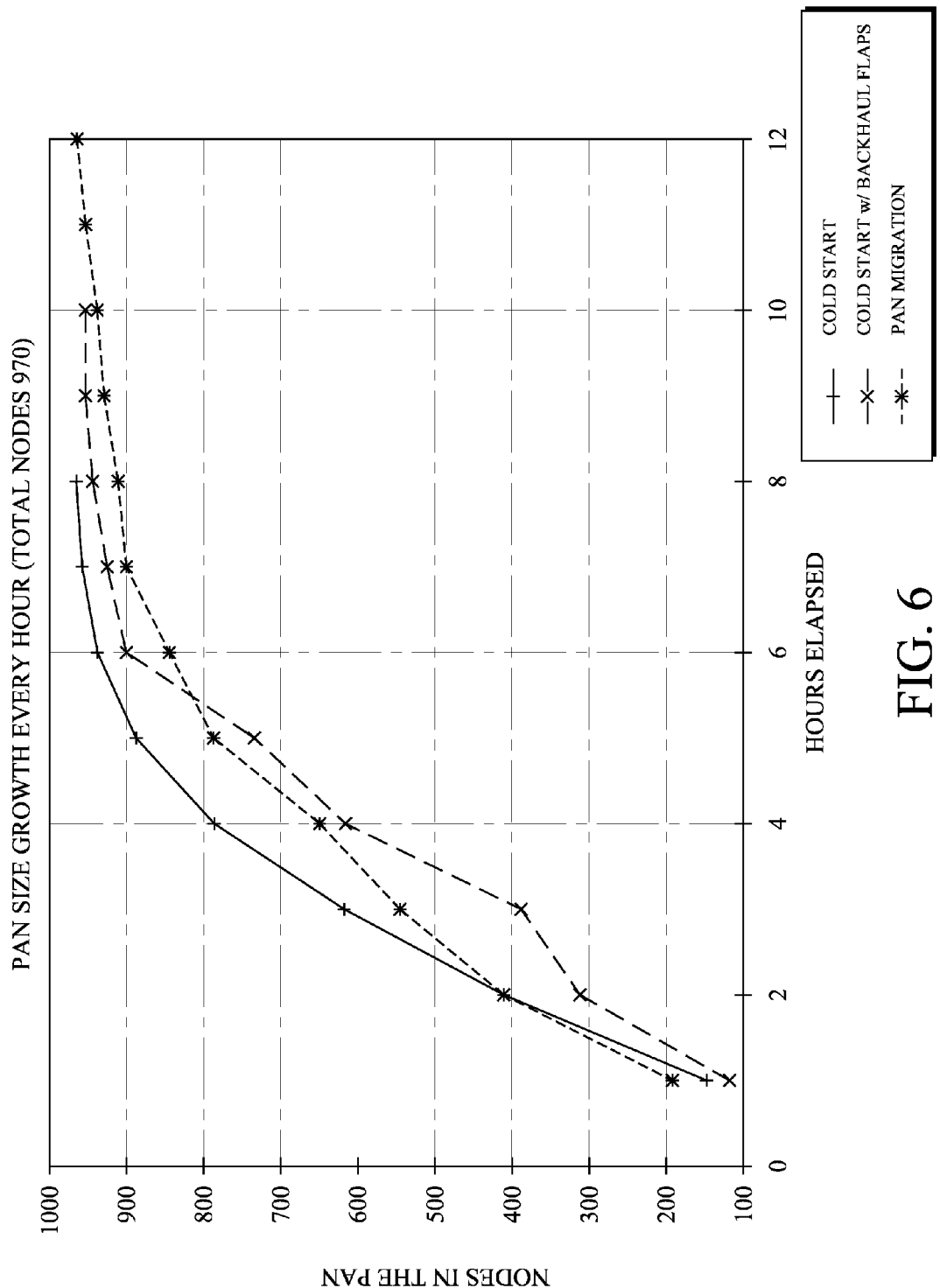
FIG. 6 illustrates an example graph regarding PAN size growth.

Note that the total time to make the network operational is unfortunately not a linear function of the number of nodes and time for each node to join the network (see FIG. 6). Indeed, these networks are using shared media, thus having thousands of nodes trying to join the LLNs may lead to major issues, not mentioning that some of these nodes may experience very poor quality paths to the FAR according to their distance and number of hops to the FAR. FIG. 6 shows the number of nodes joining a 1,000 node mesh as a function of time; even in a relatively small network (1,000) one can observe the non-linearity of the joining time.

Abnormal joining times for nodes in LLNs is considered a critical network deficiency. Abnormal joining times may be caused by packet, connectivity losses or other causes currently not well understood. In addition, the root cause varies between networks, making the configuration of static rules impossible to detect a malfunction.

U.S. Provisional Patent Application Ser. No. 61/761,117, entitled "Learning Machine Based Detection of Abnormal Network Performance", filed by Vasseur et al. on Feb. 5, 2013, specifies a Learning Machine architecture and algorithm used to compute a regression function mapping the properties of a node Ni to an estimate of a metric Mi. The techniques herein use this architecture to compute the expected joining time T[i] for a node Ni. In order to compute the regression function, the learning Machine (LM) requires to gather the set of observed T[i] in the network. To that end, the first possibility may consist in monitoring the joining time thanks to DPI (Deep Packet Inspection), thus inspecting the sequence of message taking place when a node joins the network; unfortunately this is not only costly but may simply not be applicable because of message encryption. Another option would be for the node to sends reports to the NMS: unfortunately, this would require the FAR to provide a vast amount of information to the NMS related to the routing topology, network states (currently not available at the NMS), which would involve a large amount of traffic thus an ill suited approach for LLN.

The techniques herein propose an efficient end-node driven approach used to report joining times only when such information effectively provides additional information to the Learning Machine. In particular, given a statistical model of the relationship between node properties $x_i$ and an estimate $M_i$ of the metric for node i, one may compute the optimal rate $\rho_i$ at which the node shall be probed. This rate may be obtained in several different ways: (1) using heuristics such as the one described in U.S. Provisional Patent Application Ser. No. 61/761,117, (2) using the interval of confidence on the estimate of $M_i$ (that is, probing those nodes for which the interval of confidence is larger than a user-defined value, or, more generally, setting the probing rate proportionally to the interval of confidence), (3) using a decision theory based information-theoretic criteria for guiding the probing process.

Said differently, the techniques herein, in the specific case of joining times, 1) rely on the computation of joining times by the end-node (much more accurate and less costly than the usual techniques consisting of reporting joining time to the NMS), 2) specify a mechanism in order to dynamically signal when the joining time of a node is required; 3) use a learning machine computing interval ranges of joining time values for which the level of confident is high according to the set of learned events; and 4) rely on joining times intervals computed by the learning machine to filter out the messages sent by end-point so that joining times T[i] are only reported to the LM when they provide are relevant (in contrast with simple arbitrary threshold-based approaches).

Note that the techniques herein apply to a wide set of network metrics and is described in the case of joining time (a real issue currently faced in LLNs) but is not limiting to joining times performance metrics.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Figure 7A:
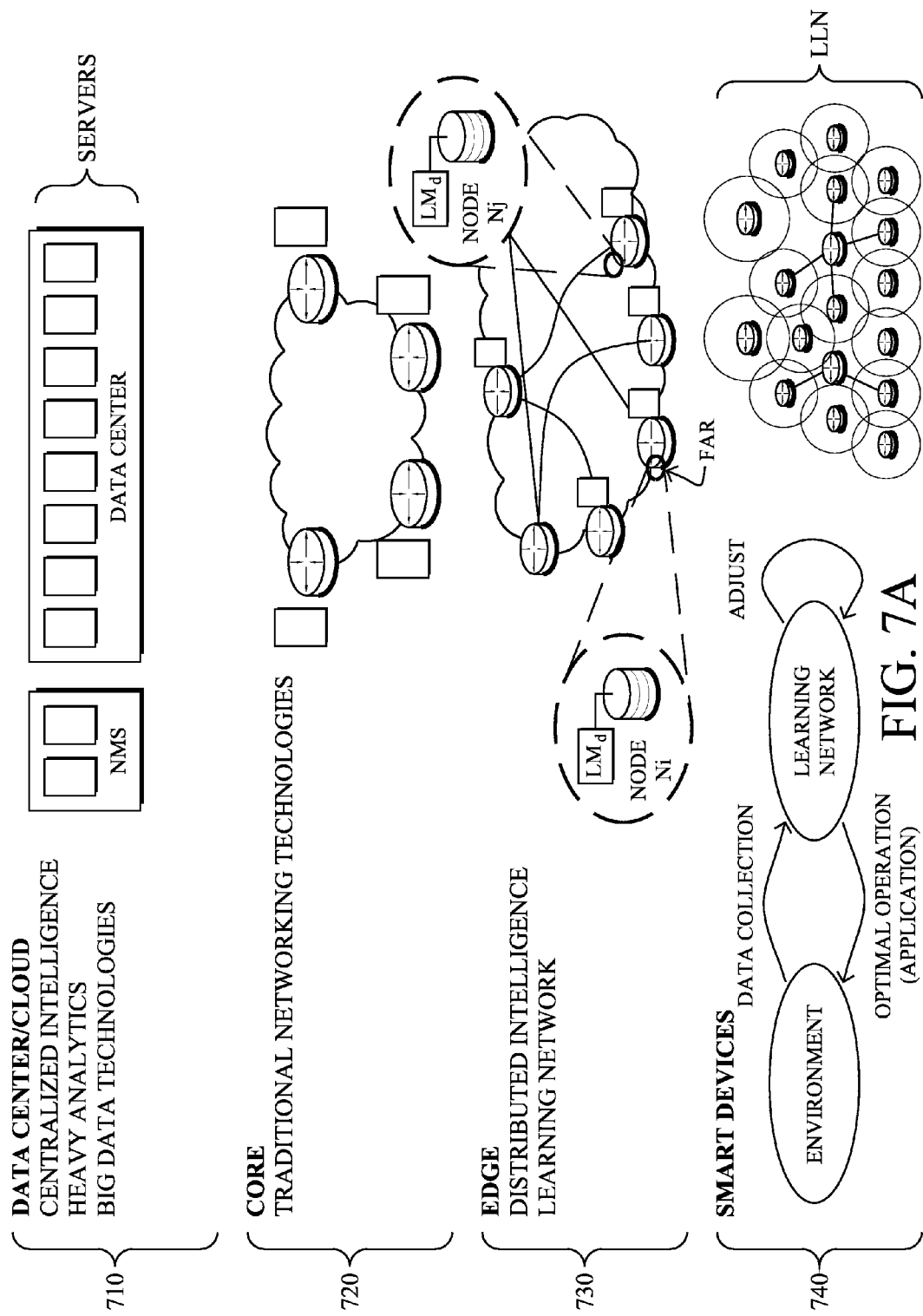
Figure 7B:
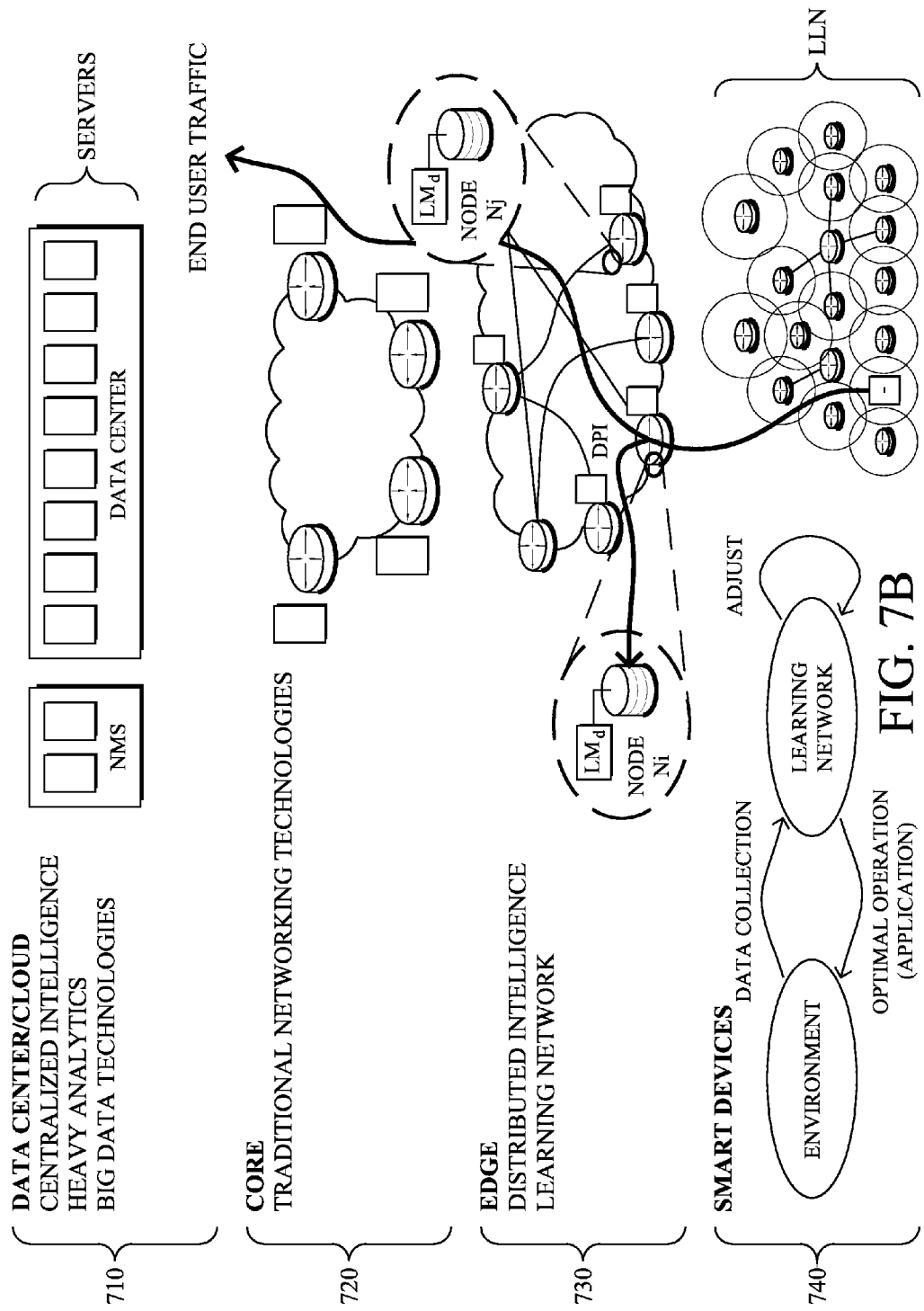

Operationally, as shown in (and with general reference to) FIGS. 7A-7E, a Learning Machine also called LM_d (Learning Machine Distributed) is hosted on the Field Area Router (FAR) or a server located at the edge of the network. Note that the LM used for detecting abnormal joining times is a sub-system of LM_d and may use different algorithms than other sub-systems. Briefly, FIGS. 7A-7E illustrate a more detailed view of the computer network of FIG. 1 as it pertains to an example distributed learning machine architecture. In particular, FIG. 7A illustrates how a data center/cloud 710 (e.g., comprising one or more NMSs, Data Center servers, or other server devices) may interconnect to a core network 720. Via one or more edge networks 730, the core 720, and hence data center/cloud 710, may reach and be reached by one or more "smart devices" network or LLN 740. Assuming that FARs or other devices in the edge network 730 are capable of hosting LM_d processes, information regarding various nodes (e.g., Ni, Nj, etc.) may be collected at each LM_d process, accordingly. In particular, for learning machine networks, data may be collected from the environment (e.g., LLN devices), which may then be used to adjust the operation of the environment based on machine learning optimization. For instance, in FIG. 7B, end user traffic (or explicit messages) may be intercepted and processed by local LM_d processes, and certain aspects of the LM processing may be delegated to a centralized LM_c process (e.g., in the data center) as shown in FIG. 7C. As such, certain parameters may be returned in FIG. 7D to the distributed LM_d hosts, to effectuate localized close-loop control over the devices in question as shown in FIG. 7E. Other distributed learning machine architectures may be used in accordance with the techniques herein, and that shown in FIGS. 7A-7E is merely for a non-limiting example illustration of a distributed learning machine architecture.

The first component of the techniques herein is a lightweight module hosted on end-nodes responsible for the calculation of the actual joining time. Indeed, in contrast with the techniques herein, with existing systems the joining time is computed by the NMS upon receiving specific events, which may not only be inaccurate but also time and bandwidth consuming.

In the techniques herein, when the node boots-up it first records when it wakes up, when the nodes' functional elements that are operational, and when the node is capable of sending traffic (the node retrieves its MAC and IP addresses, routing, QoS, and NMS modules are operational). T[i] refers to the computed joining time of node Ni. In one embodiment, T[i] is a scalar. In another embodiment, T[i] is a vector, thus providing more detailed information about the joining process (time to join the 15.4 PAN, time to obtain the IP address, time to complete the identification process, etc.).

The second component of the techniques herein is an architecture consisting of reporting joining times T[i] if the T[i] value provides relevant information for the learning machine hosted in the Field Area Router (FAR) or a remote server. Note that systematically sending T[i] is costly and may only be relevant if specific conditions discussed below are met.

According to one or more embodiments herein, a node Ni may be in two states:

*U-state: Unknown (the LM does not have any information about the node); or

*K-state: the LM has gathered enough data about the joining time of the node (or similar nodes) and only requires updates regarding joining times that provide additional information (defined below). (Note that in the context of a regression, data need not necessarily be gathered from a particular node for predicting its joining time, i.e., the data may have been gathered from similar nodes.)

The Learning Machine (LM) specified in U.S. Provisional Patent Application Ser. No. 61/761,117 maintains a white list of nodes that are in K-state. The techniques herein specify a newly defined IPv6 unicast message sent by the LM to the DHCP server that carries the white list. Each time the white list changes, a copy of the new white list is provided to the DHCP server.

Figure 8A:
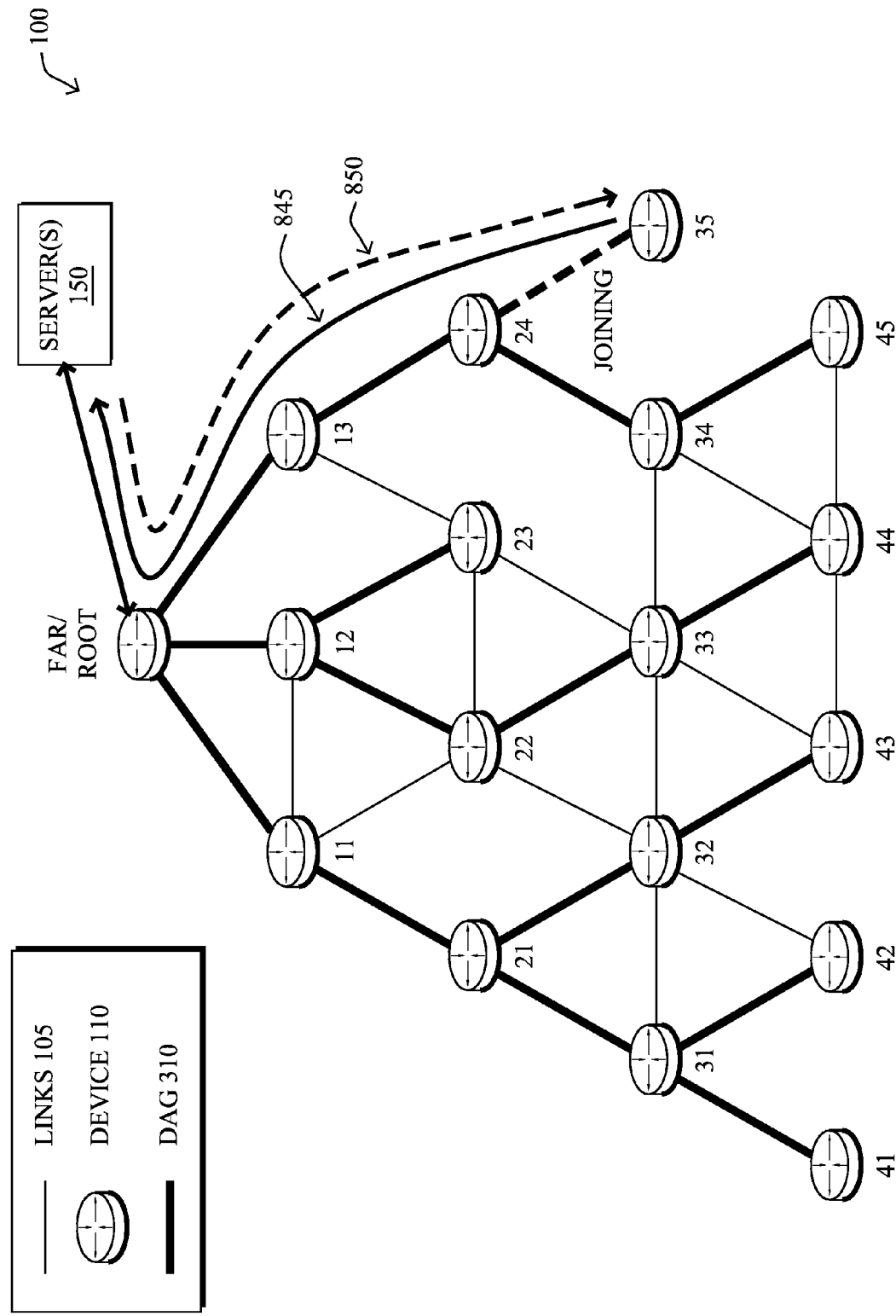
FIGS. 8A-8B illustrate an example of node joining and join time reporting.
Figure 8B:
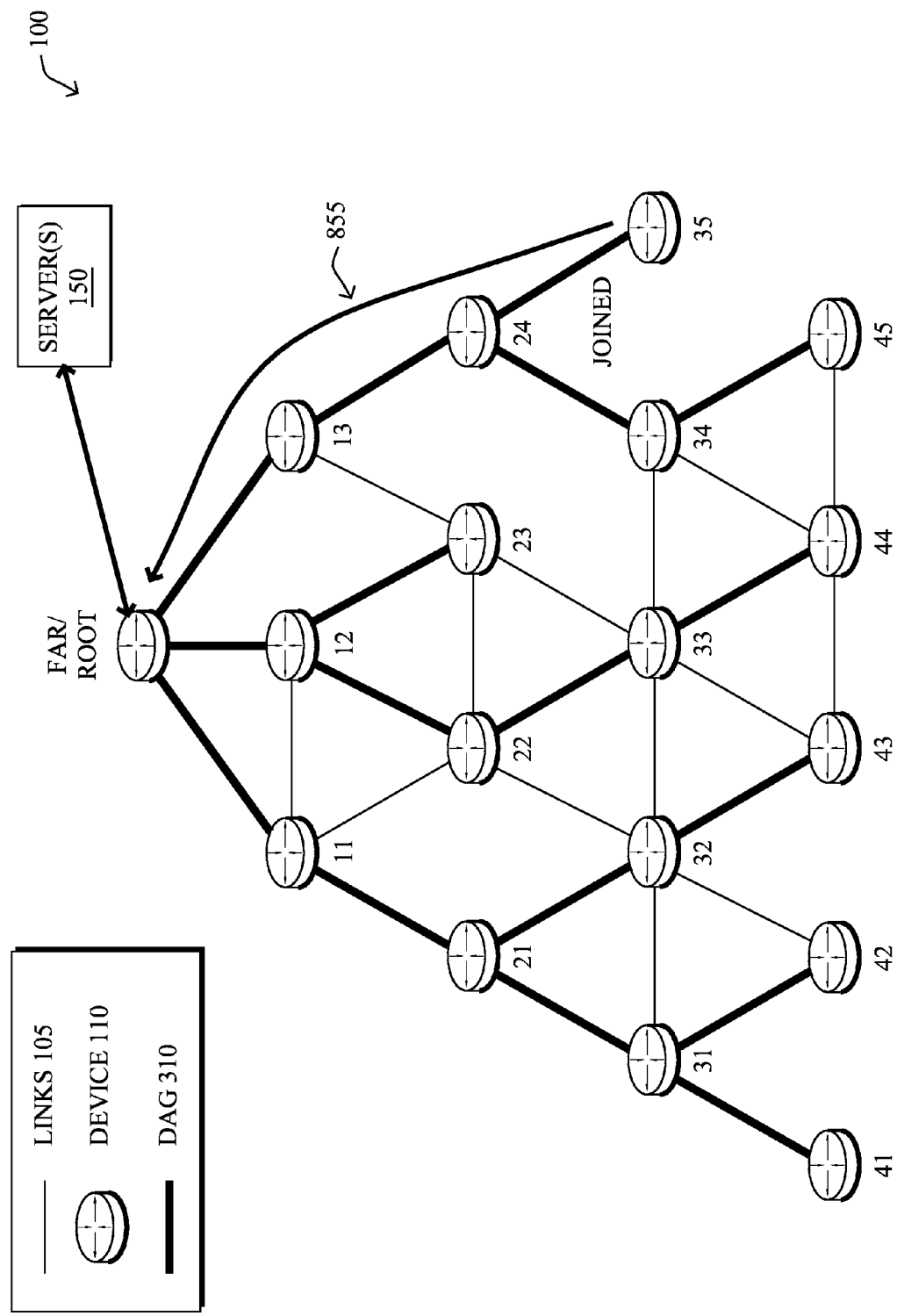

As shown in FIG. 8A, when a node Ni (e.g., node 35) joins the network, it first records its new T[i], and during the joining process it sends a configuration request 845 (e.g., DHCP) request to a server (e.g., a DHCP server) (that may be hosted on the FAR or on a separate server if the FAR acts as a DHCP relay), and receives a response 850. For instance, if Ni does not belong to the white list, the DHCP server set a newly specified flag R (request) in the DHCP reply. Upon receiving the DHCP reply with the R flag set, the node Ni learns that it is requested to provide its joining time T[i] to the LM (or the NMS that may in turn feed the LM), which by default is hosted on the FAR, whose address is well-known (or if the LM is hosted on a separate server the compressed address of the LM is provided by the DHCP server). Note that the use of DHCP to carry these requests allows for extremely lightweight signaling. Accordingly, as shown in FIG. 8B, the node Ni may provide the join time 855 to the "collector" device (e.g., LM, FAR, NMS, etc.).

In one embodiment, T[i] may be provided by piggybacking in routing protocol messages (e.g., new TLVs carried in DAO message of RPL), or a newly specified TLV carried in RREP message of AODVv2 upon receiving a route request from the FAR or alternatively pro-actively provided in a RREP). In another embodiment the value of T[i] is provided to the LM thanks to a newly defined unicast message. Should T[i] be a vector of values, these continuous spaces may be divided in a set of discrete ranges encoded using a bloom filter to compress the message size. In a third embodiment, T[i] is obtained by performing shadow joining or triggered reboot (U.S. Provisional Patent Application Ser. No. 61/761,110, entitled "Fast Learning to Train Learning Machines Using Shadow Joining" and U.S. Provisional Patent Application Ser. No. 61/761,116, entitled "Fast Learning to Train Learning Machines Using Smart-Triggered Reboot", respectively, each filed by Vasseur et al. on Feb. 5, 2013). In the two first cases, probing is done opportunistically and it may be turned on and off. In the third case, probing is done explicitly at a given rate $\rho_{probe}$, which may be adjusted by the LM_d as a function of the quality of the estimate it has of T[i].

The third component of the techniques herein is the computation of a confidence interval by the LM. Indeed, the role of the LM is to compute the set of values T[i] expressed using an interval Int_i of values for which the confidence is higher than X %. In other words, thanks to the learning of past events, the LM expect T[i] to fall in the interval Int_i with a confidence of H. (Refer to FIG. 9 for an illustration of confidence.)

To estimate the function f that map the properties of node Ni (written $x_i$) to the joining time T[i], we use an algorithm called the Variational Bayes Least Square (VBLS) regression described above. The algorithm is a Bayesian extension of the well-known statistical regression technique of back-fitting. Using this algorithm, we can estimate the vector b that defines the mapping (linear or non-linear) between $x_i$, and T[i]:

$$T[i]=b^T x_i + \epsilon$$

VBLS being a fully Bayesian method, it also provides confidence intervals on the estimate T[i], that is, an interval $[T_{5\%}[i], T_{95\%}[i]]$ that contains 90% of all data points. As a result, if this interval is small, it means that the estimate of T[i] is good (assuming that the intrinsic variability of T[i] is actually small). As a result, when the quantity $|T_{95\%}[i]-T_{5\%}[i]|$ is smaller than a given user-defined threshold, one may set $\rho_{probe}$ to some low value. Whenever the node i changes its state (i.e., its position in the space defined by the values of $x_i$), the quantity $|T_{95\%}[i]-T_{5\%}[i]|$ is computed again for the new input data $x_i$, and the rate is set accordingly. For instance, if the node i moves up or down in the DAG, its rate may be adjusted by the LM_d depending on whether it has a lot of data from nodes in this region of the DAG or not.

In the embodiment where the nodes transmit their T[i] to the FAR using unicast messages, the LM will update the white list with those nodes that do not need to update the LM and sends a novel unicast message to Ni reporting the interval Int_i=$[T_{100-x\%}[i], T_{x\%}[i]]$ (where x is user-defined). At this point, the node only reports T[i] if and only is it does not belong to the computed interval Int_i provided by the LM. This allows to significantly reducing the amount of messages sent to the LM, which is of the utmost importance in LLNs.

Figure 10A:
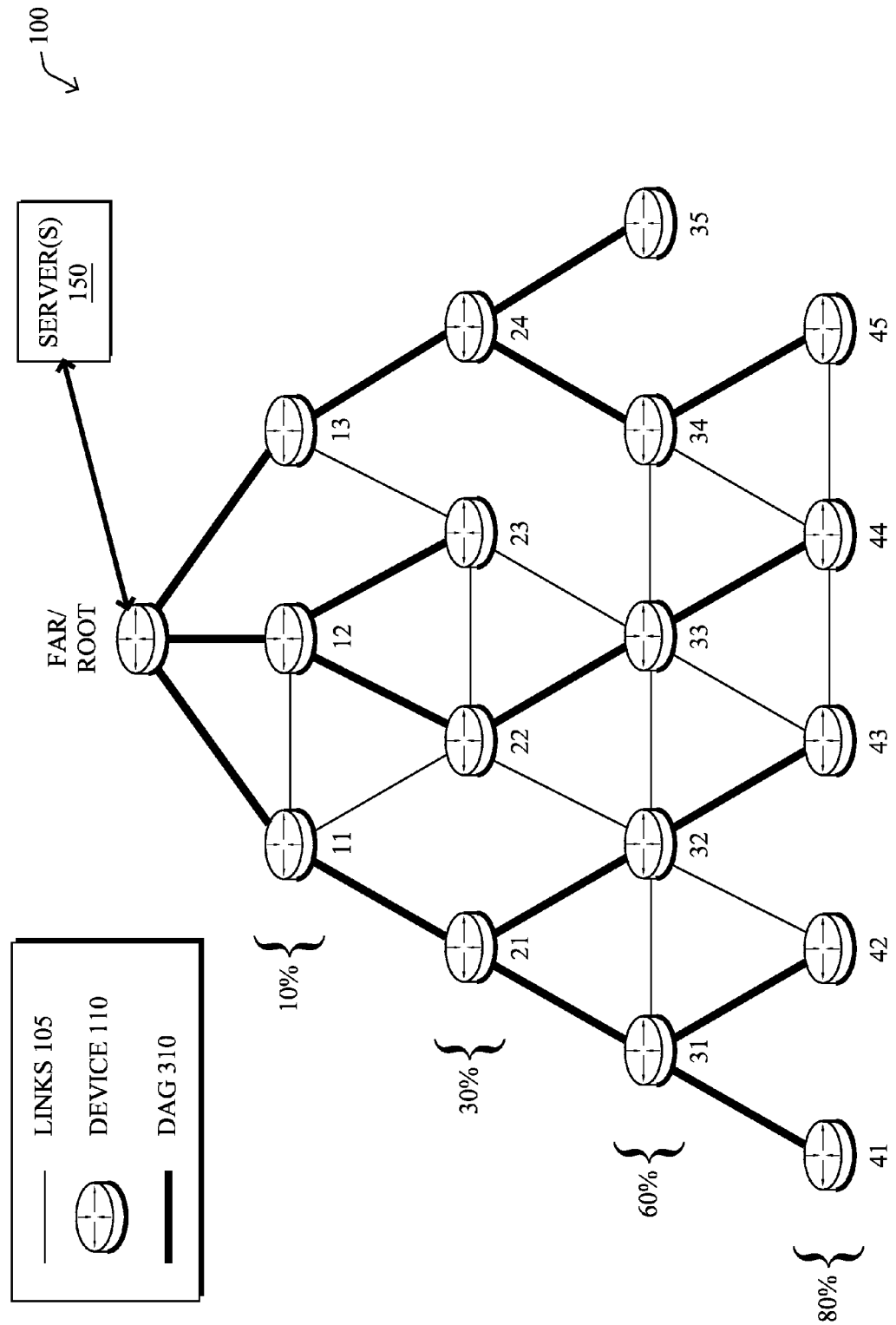
FIGS. 10A-10B illustrate examples of join time reporting rates.
Figure 10B:
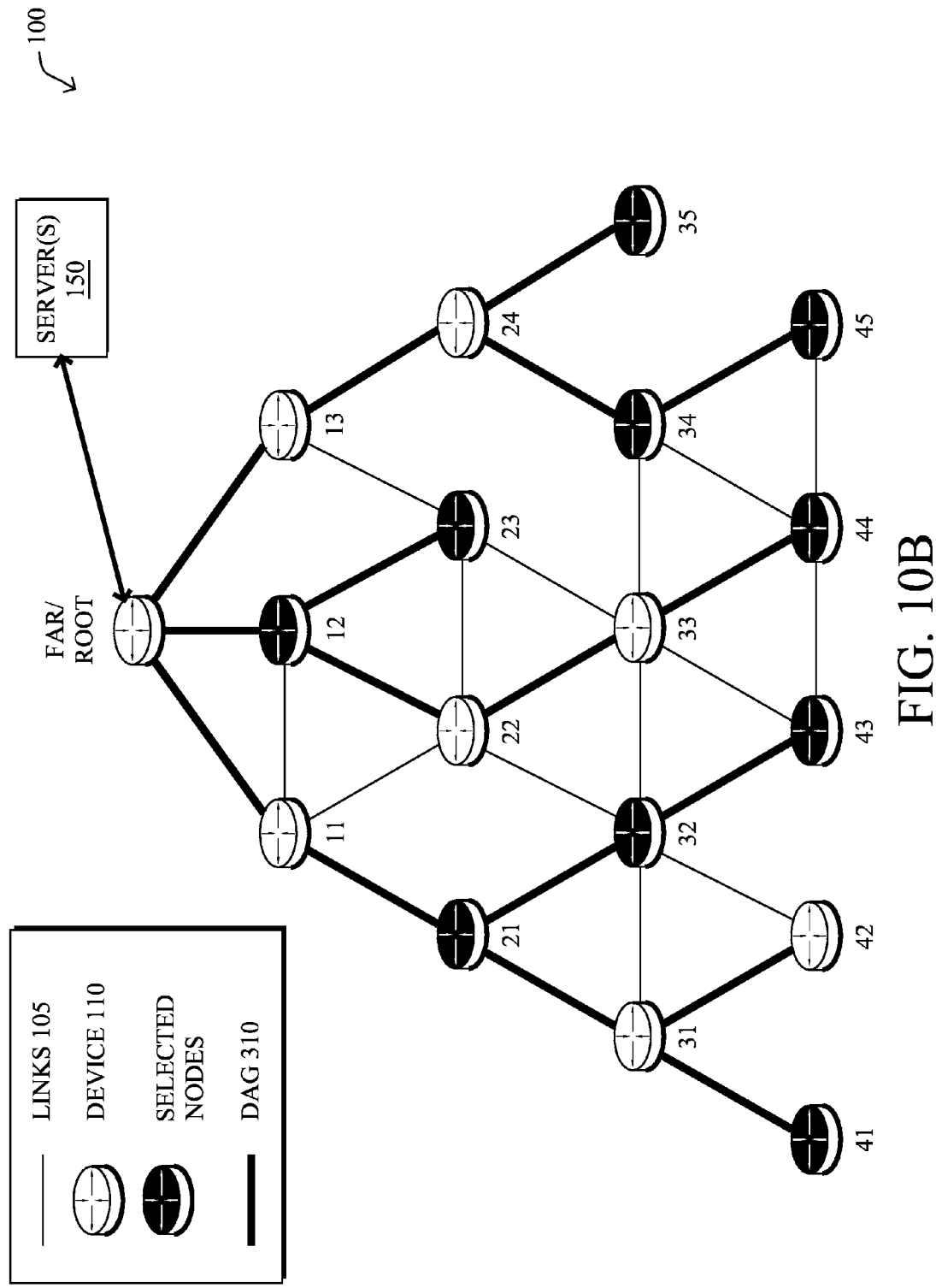

As an example, FIG. 10A illustrates how different join time collection rates may be applied throughout the network, such as based on the confidence interval computed according to various node properties. For instance, assuming that the confidence in join times for nodes may correspond to their DAG depth, it is possible for the LM computation to result in each depth having a corresponding rate (e.g., having the closest nodes (depth/rank 1) reporting 10% of the time or only having 10% of those nodes report, while increasing the rate for each subsequent depth, etc.). Alternatively, as shown in FIG. 10B, certain select nodes may be chosen/instructed to provide their join times, whether because they represent a particular class of node properties (e.g., a particular DAG depth/rank, a physical location, a number of children, etc.), because they are an explicit selection of a percentage of the nodes representing that particular class, and/or because of other reasons as determined by the LM process.

Figure 11A:
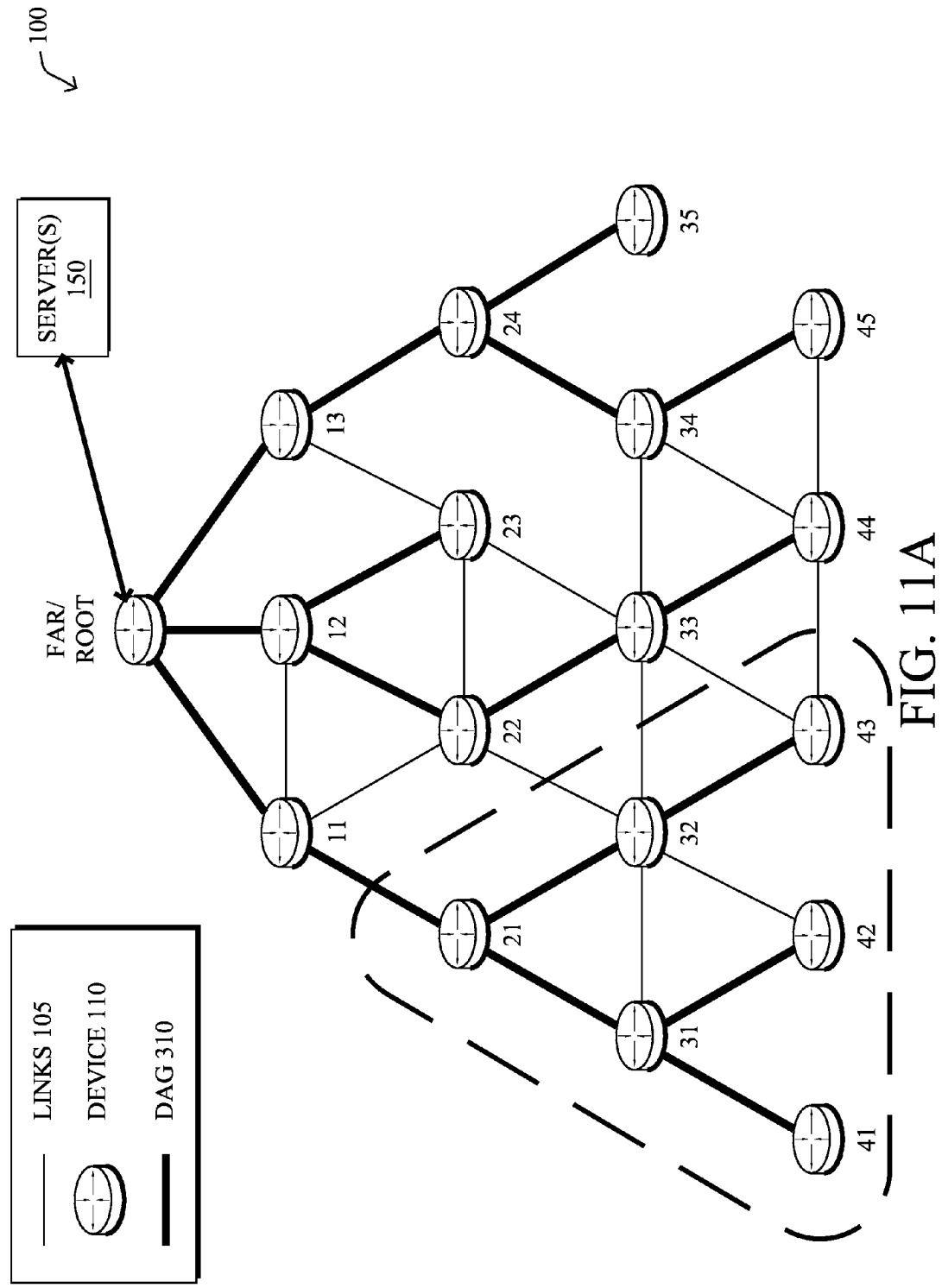
FIGS. 11A-11B illustrate examples of probing regions.
Figure 11B:
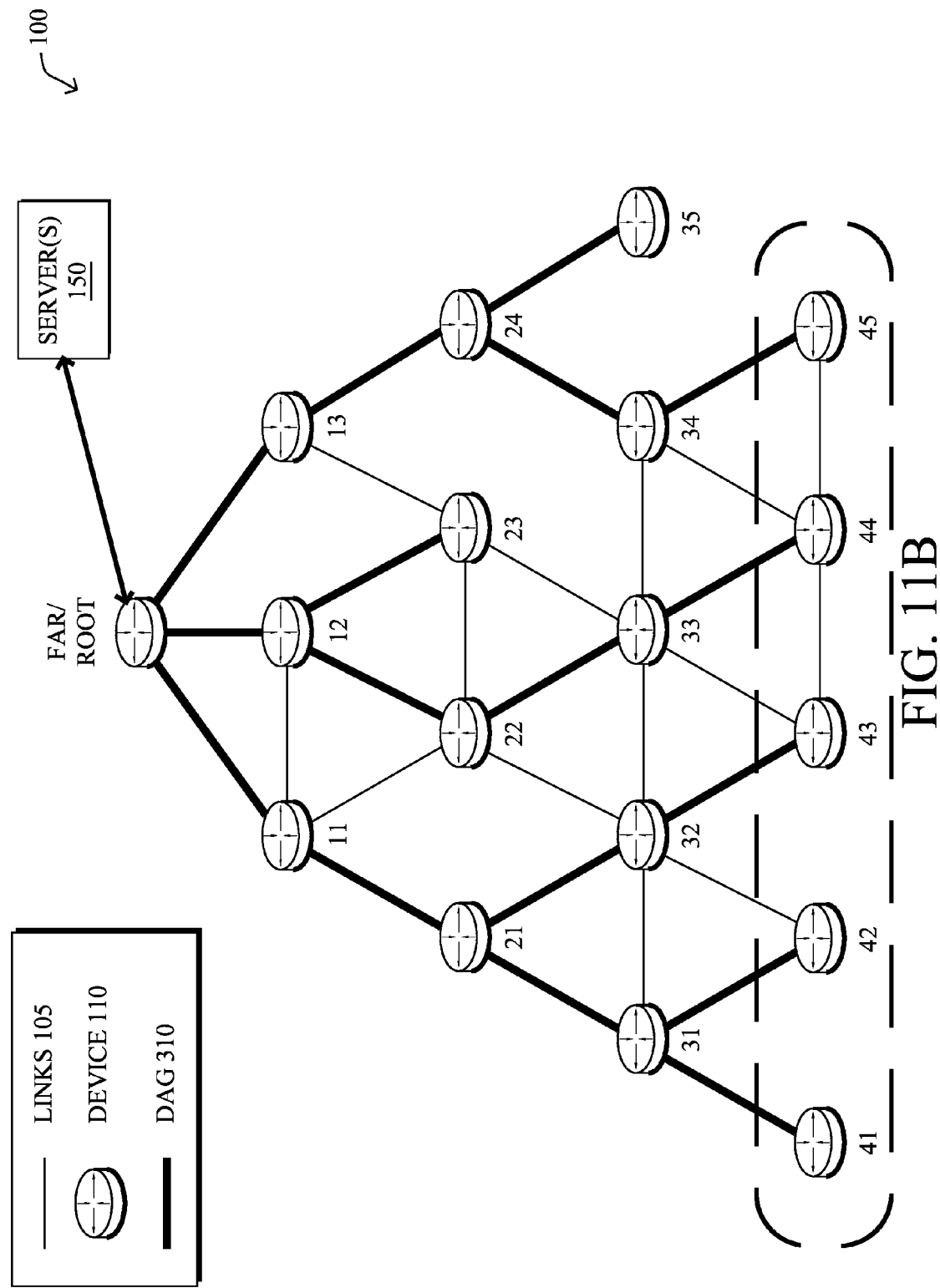

In the embodiment where T[i] is collected through shadow joining and triggered reboots, the techniques ensure probing those nodes that will maximize the acquired information. This can be done by computing the variation in entropy $\Delta S$ expected upon probing Ni. If this quantity is computed for all nodes in the network, the expected entropy reduction for whole regions may also be obtained. By identifying subsets of the DAGs whose expected entropy reduction is very large, one may use a remote probing mechanism as described in U.S. Provisional Patent Application Ser. No. 61/761,106, entitled "Remote Probing for Remote Quality of Service Monitoring", filed by Vasseur et al. on Feb. 5, 2013, for achieving very efficient metric probing while maximizing the acquired information. For example, as shown in FIGS. 11A and 11B, remote probing "zones" may correspond to a sub-DAG (FIG. 11A), a DAG depth (e.g., FIG. 11B), or any other corresponding DAG subset computable by the systems described herein.

Figure 12:
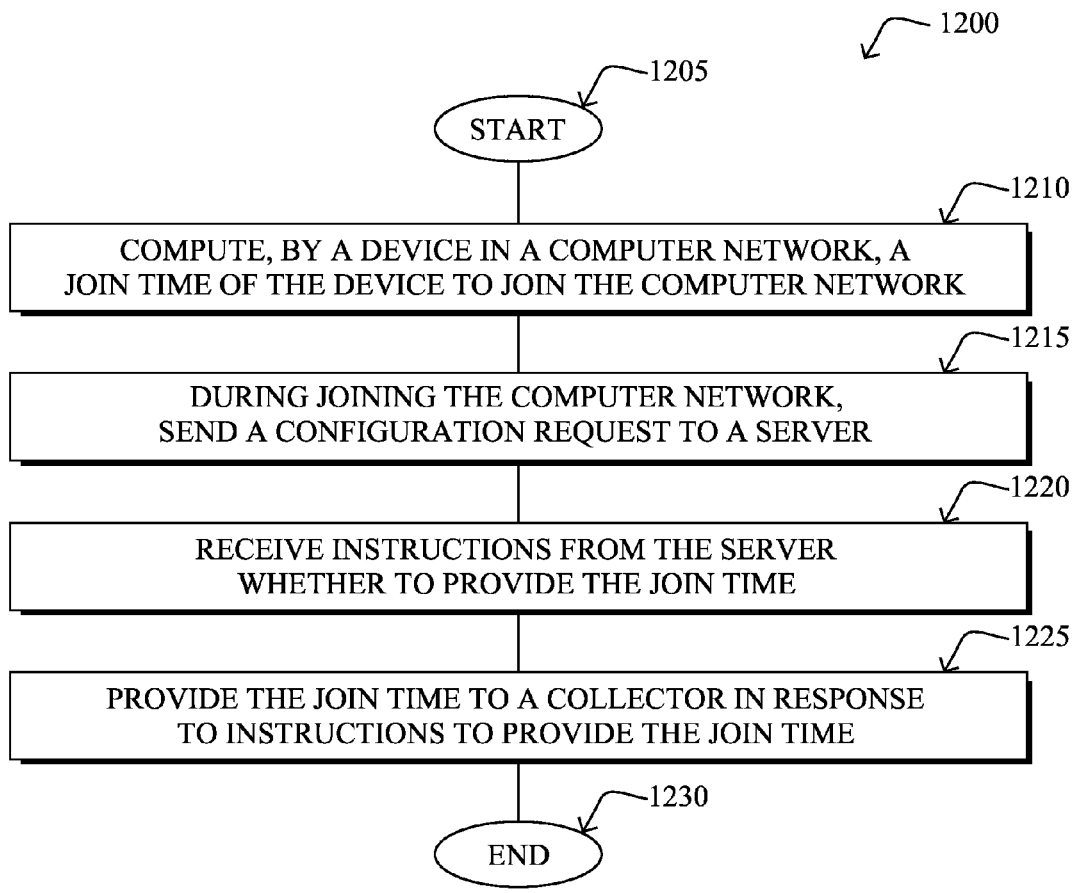
FIG. 12 illustrates an example simplified procedure for learning machine based computation of network join times, particularly from the perspective of a device in the computer network.

FIG. 12 illustrates an example simplified procedure 1200 for learning machine based computation of network join times in accordance with one or more embodiments described herein, particularly from the perspective of a device in the computer network. The procedure 1200 may start at step 1205, and continues to step 1210, where, as described in greater detail above, a device computes its join time to join the computer network, such as by recording a wake-up time when functional elements of the device are operational, and determining when the device is capable of sending traffic within the computer network and the difference from the recorded wake-up time, as mentioned above. During joining the computer network, in step 1215 the device sends a configuration request to a server (e.g., a DHCP request to a DHCP server), and receives instructions from the server whether to provide the join time in step 1220 (e.g., a bit set in a configuration reply from the server). Accordingly, in step 1225, the device may provide the join time to a collector (e.g., LM, FAR, NMS) in response to instructions to provide the join time (e.g., as an independent message or piggybacking the join time within a host message, such as a routing protocol message). Note that as described above, the provided join time may be either a scalar having only the provided join time or a vector having a plurality of information regarding the provided join time. Also, in one embodiment, the provided join time may be a selection of a particular range of join times within which the computed join time falls. The procedure 1200 illustratively ends in step 1230, until the device re-joins (or mimics rejoining) of a/the network at a later time.

Figure 13:
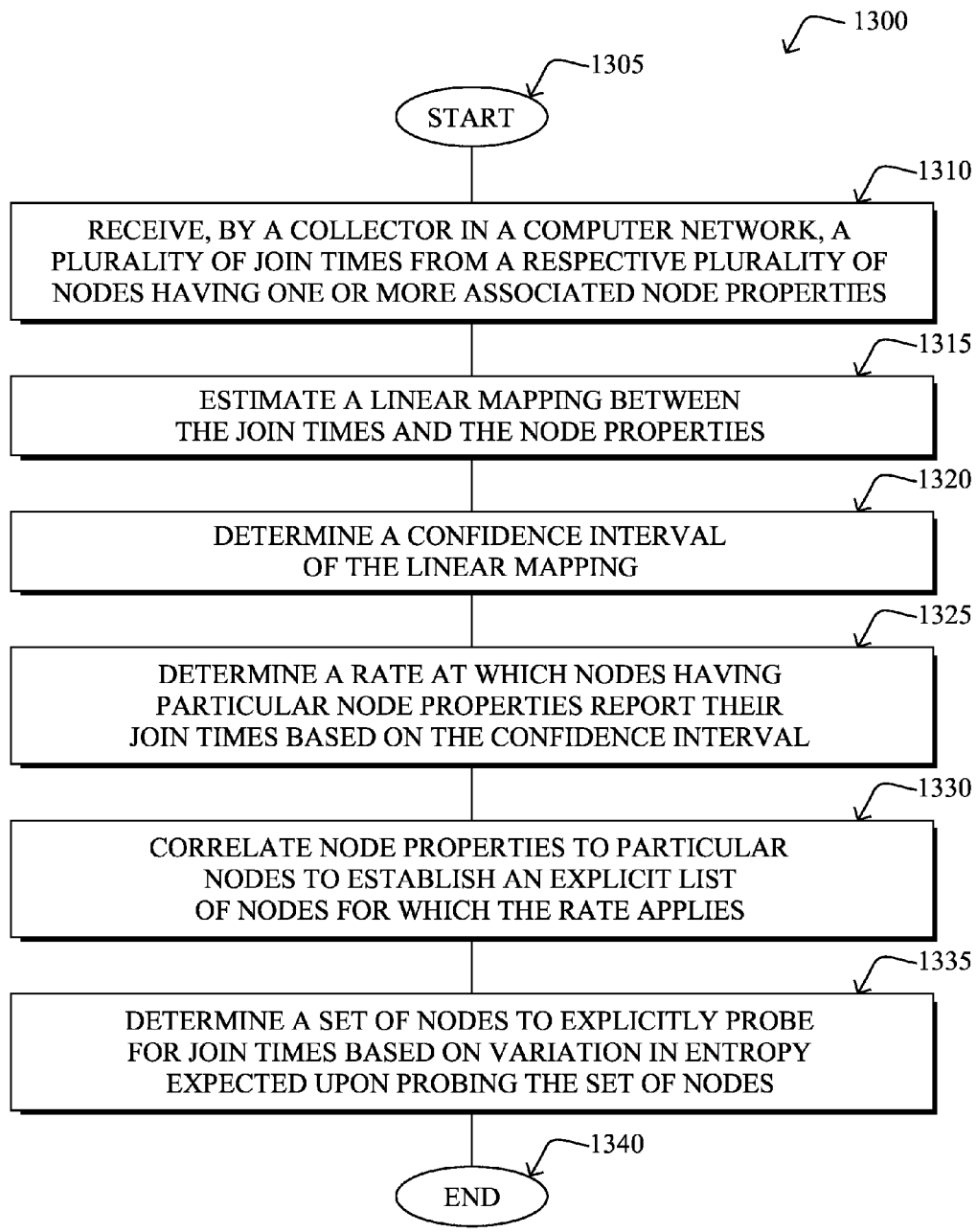
FIG. 13 illustrates another example simplified procedure for learning machine based computation of network join times, particularly from the perspective of a collector.

In addition, FIG. 13 illustrates another example simplified procedure 1300 for learning machine based computation of network join times in accordance with one or more embodiments described herein, particularly from the perspective of a collector (e.g., LM, FAR, NMS). The procedure 1300 may start at step 1305, and continues to step 1310, where, as described in greater detail above, a collector (e.g., NMS, LM, FAR, etc.) receives a plurality of join times from a respective plurality of nodes having one or more associated node properties. From these join times, in step 1315 the collector estimates a mapping (linear or non-linear) between the join times and the node properties, and determines a confidence interval of the mapping in step 1320 as described in detail above (e.g., using a VBLS regression computation). As such, in step 1325, the collector may determine a rate at which nodes having particular node properties report their join times based on the confidence interval in a manner as detailed above. For instance, the rate may be set to each time a node joins the computer network ("on"), never ("off"), and any given rate less than each time a node joins the computer network (i.e., sometimes, certain nodes, only when instructed, etc.).

Notably, in step 1330, the collector may also correlate node properties to particular nodes to establish an explicit list of nodes for which the rate applies (e.g., as shown in FIG. 10B). Also, in step 1335, the collector may determine a set of nodes to explicitly probe for join times based on variation in entropy expected upon probing the set of nodes (e.g., as shown in FIGS. 11A-11B). The procedure 1300 illustratively ends in step 1340, notably with the option to continue to receive join times and to compute updated lists/rates/etc., accordingly.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The techniques described herein, therefore, provide for learning machine based computation of network join times. In particular, to avoid a tremendous number of messages sent out to the NMS (which is simply not viable in LLNs), the techniques herein allow learning a given metric, and determining which nodes provide additional information, and then only send relevant information to the learning machine, thus drastically reducing the number of messages. In the context of joining times, which are key network performance metrics, several embodiments of probing mechanisms are proposed (e.g., piggybacking in routing messages, new unicast messages, shadow joining, triggered reboots), whose scheduling and addressing can be adjusted and optimized by feedback mechanisms from the learning machine.

While there have been shown and described illustrative embodiments that provide for learning machine based computation of network join times, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   initiating joining by a device to a computer network;
   during joining the computer network, sending, by the device, a configuration request to a server;
   responsive to joining the computer network, computing, by the device, a join time, the join time representing an amount of time by the device to join the computer network;
   receiving, at the device, instructions from the server whether to provide the join time to a collector, wherein the server is configured to determine whether or not the join time should be reported to a collector based at least in part on an optimal rate, the optimal rate only reporting the join time when the join time would provide additional information to a learning machine model executing on the collector, wherein the learning machine model calculates the optimal rate given a statistical model of a relationship between node properties and an estimate of a metric for the device; and
   sending, by the device, the join time to the collector if and only if instructions from the server are received to send the join time to the collector.

2. The method as in claim 1, wherein the provided join time comprises one of either a scalar having only the provided join time or a vector having a plurality of information regarding the provided join time.

3. The method as in claim 1, wherein computing the join time comprises:
   recording a wake-up time when functional elements of the device are operational; and
   determining when the device is capable of sending traffic within the computer network and the difference from the recorded wake-up time.

4. The method as in claim 1, wherein the configuration request is a dynamic host configuration protocol (DHCP) request to a DHCP server.

5. The method as in claim 1, wherein the instructions comprise a bit set in a configuration reply from the server.

6. The method as in claim 1, wherein the collector is a field area router (FAR) or a network management server (NMS).

7. The method as in claim 1, wherein providing the join time comprises one of either sending an independent message or piggybacking the join time within a host message.

8. The method as in claim 7, wherein the host message is a routing protocol message.

9. The method as in claim 1, wherein the provided join time is a selection of a particular range of join times within which the computed join time falls.

10. The method as in claim 1, wherein whether to provide the join time is based on the collector:
    receiving a plurality of join times from a respective plurality of nodes having one or more associated node properties;
    estimating a mapping between the join times and the node properties;
    determining a confidence interval of the mapping; and
    determining a rate at which nodes having particular node properties report their join times based on the confidence interval.

11. A method, comprising:
    receiving, by a learning machine in a computer network executing a regression computation process to estimate a mapping between join time and node properties, a plurality of join times from a respective plurality of nodes having one or more associated node properties, the join times representing an amount of time by the respective plurality of nodes to join the computer network;
    estimating, by the learning machine, the mapping between the join times and the one or more associated node properties, wherein the mapping is a statistical model of a relationship between node properties and an estimate of a metric for a given node;

determining, by the learning machine, a confidence interval of the mapping;

determining, by the learning machine, a rate at which nodes having particular node properties report their join times based on the confidence interval; and causing instructions to be sent to the respective plurality of nodes to report their join times at the determined rate.

12. The method as in claim 11, wherein the rate is each time a node joins the computer network, never, or a given rate less than each time a node joins the computer network.

13. The method as in claim 11, further comprising:

correlating node properties to particular nodes to establish an explicit list of nodes for which the rate applies.

14. The method as in claim 11, further comprising:

determining a set of nodes to explicitly probe for join times based on variation in entropy expected upon probing the set of nodes.

15. The method as in claim 11, wherein estimating the mapping and the confidence interval comprises a Variational Bayes Least Square (VBLS) regression computation.

16. An apparatus, comprising:

one or more network interfaces to communicate with a computer network;

a processor coupled to the network interfaces and adapted to execute one or more processes; and a memory configured to store a process executable by the processor, the process when executed operable to:

initiate joining to a computer network;

during joining the computer network, send a configuration request to a server;

responsive to joining the computer network, compute a join time, the join time representing an amount of time by the apparatus to join the computer network;

receive instructions from the server whether to provide the join time to a collector, wherein the server is configured to determine whether or not the join time should be reported to a collector based at least in part on an optimal rate, the optimal rate only reporting the join time when the join time would provide additional information to a learning machine model executing on the collector, and wherein the learning machine model calculates the optimal rate given a statistical model of a relationship between node properties and an estimate of a metric for the apparatus; and send the join time to the collector if and only if instructions from the server are received to send the join time to the collector.

17. The apparatus as in claim 16, wherein the provided join time comprises one of either a scalar having only the provided join time or a vector having a plurality of information regarding the provided join time.

18. An apparatus, comprising:

one or more network interfaces to communicate with a computer network;

a processor coupled to the network interfaces and adapted to execute one or more processes wherein at least one of the one or more processes is a learning machine process executing a regression computation process to estimate a mapping between join time and node properties; and a memory configured to store the learning machine process executable by the processor, the learning machine process when executed operable to:

receive, as a collector in a computer network, a plurality of join times from a respective plurality of nodes having one or more associated node properties, the join times representing an amount of time by the respective plurality of nodes to join the computer network;

estimate the mapping between the join times and the one or more associated node properties, wherein the mapping is a statistical model of a relationship between node properties and an estimate of a metric for a given node;

determine a confidence interval of the mapping;

determine a rate at which nodes having particular node properties report their join times based on the confidence interval; and cause instructions to be sent to the respective plurality of nodes to report their join times at the determined rate.

19. The apparatus as in claim 18, wherein the process when executed is further operable to:

correlate node properties to particular nodes to establish an explicit list of nodes for which the rate applies.

20. The apparatus as in claim 18, wherein the process when executed is further operable to:

determine a set of nodes to explicitly probe for join times based on variation in entropy expected upon probing the set of nodes.

* * * * *